US007006704B2

(12) United States Patent
Kobayashi et al.

(10) Patent No.: US 7,006,704 B2
(45) Date of Patent: Feb. 28, 2006

(54) METHOD OF AND APPARATUS FOR IMPROVING PICTURE QUALITY

(75) Inventors: Michio Kobayashi, Minato-ku (JP); Reiichi Kobayashi, Minato-ku (JP)

(73) Assignee: NEC Viewtechnology, Ltd., Tokyo (JP)

( * ) Notice: Subject to any disclaimer, the term of this patent is extended or adjusted under 35 U.S.C. 154(b) by 618 days.

(21) Appl. No.: 10/102,000

(22) Filed: Mar. 21, 2002

(65) Prior Publication Data

US 2002/0149685 A1 Oct. 17, 2002

(30) Foreign Application Priority Data

Mar. 23, 2001 (JP) ............................ 2001-085616

(51) Int. Cl.
*G06K 9/40* (2006.01)

(52) U.S. Cl. ...................... 382/264; 382/260; 382/274; 382/275; 358/3.26; 358/3.27

(58) Field of Classification Search ................ 382/167, 382/171, 260, 264, 266, 269, 274, 275, 282; 358/3.26, 3.27, 520, 463; 348/576, 587, 348/607

See application file for complete search history.

(56) References Cited

U.S. PATENT DOCUMENTS

| | | | | |
|---|---|---|---|---|
| 4,302,777 A | 11/1981 | Kemner et al. | | |
| 4,987,350 A * | 1/1991 | Hartmann et al. | .......... | 315/382 |
| 5,748,257 A | 5/1998 | Kawabata et al. | | |
| 6,081,302 A | 6/2000 | Hanai | | |
| 6,362,816 B1 * | 3/2002 | Kawanami et al. | ......... | 345/214 |
| 6,661,470 B1 * | 12/2003 | Kawakami et al. | ......... | 348/699 |
| 6,717,622 B1 * | 4/2004 | Lan | ............................ | 348/625 |
| 6,750,855 B1 * | 6/2004 | Von Hase | ................... | 345/204 |

FOREIGN PATENT DOCUMENTS

| | | |
|---|---|---|
| EP | 0 507 593 A2 | 10/1992 |
| GB | 2 325 585 A | 11/1998 |
| GB | 2 352 352 A | 1/2001 |
| JP | 61-87493 A | 5/1986 |
| JP | 61-88663 A | 5/1986 |
| JP | 61-88664 A | 5/1986 |
| JP | 61-88665 A | 5/1986 |
| JP | 61-88667 A | 5/1986 |
| JP | 61-88668 A | 5/1986 |

(Continued)

OTHER PUBLICATIONS

H. Isono et al., Television Society Technical Reports, VVI 24-2, (Nov. 24, 1977), pp. 7-13.

*Primary Examiner*—Sanjiv Shah
*Assistant Examiner*—Yosef Kassa
(74) *Attorney, Agent, or Firm*—Sughrue Mion, PLLC

(57) ABSTRACT

A picture quality improving apparatus which is low in cost and small in circuit scale has a vertical low-pass filter (LPF) for extracting a vertical low-frequency component from an input luminance signal, a horizontal LPF for extracting a horizontal low-frequency component from the output signal from the vertical LPF, a subtractor for subtracting the output signal from the horizontal LPF from the luminance signal which has been compensated for the delay, a gain adjusting circuit for adjusting the gain of an edge signal produced by the subtractor, and an adder for adding the edge signal whose gain has been adjusted to the delay-compensated luminance signal. Each of the vertical LPF and the horizontal LPF comprises an FIR (finite impulse response) filter and an IIR (infinite impulse response) filter which are connected in cascade or parallel to each other.

28 Claims, 15 Drawing Sheets

FOREIGN PATENT DOCUMENTS

| | | | |
|---|---|---|---|
| JP | 61-88669 | A | 5/1986 |
| JP | 61-270987 | A | 12/1986 |
| JP | 61-270991 | A | 12/1986 |
| JP | 61-270992 | A | 12/1986 |
| JP | 61-270993 | A | 12/1986 |
| JP | 61-270994 | A | 12/1986 |
| JP | 61-270995 | A | 12/1986 |
| JP | 61-295786 | A | 12/1986 |
| JP | 61-295787 | A | 12/1986 |
| JP | 61-295789 | A | 12/1986 |
| JP | 61-295790 | A | 12/1986 |
| JP | 61-295791 | A | 12/1986 |
| JP | 61-295793 | A | 12/1986 |
| JP | 61-296879 | A | 12/1986 |
| JP | 61-296880 | A | 12/1986 |
| JP | 61-296881 | A | 12/1986 |
| JP | 61-296883 | A | 12/1986 |
| JP | 61-296884 | A | 12/1986 |
| JP | 1-246985 | A | 10/1989 |
| JP | H02-142279 | A | 5/1990 |
| JP | H04-139965 | A | 5/1992 |
| JP | H04-357776 | A | 12/1992 |
| JP | H05-090898 | A | 4/1993 |
| JP | H07-135583 | A | 5/1995 |
| JP | H09-154044 | A | 6/1997 |
| JP | H11-196294 | A | 7/1999 |
| JP | H11-355608 | A | 12/1999 |
| JP | 2000-004379 | A | 1/2000 |

* cited by examiner

FIG. 6 (Backgroung Art)

METHOD OF AND APPARATUS FOR IMPROVING PICTURE QUALITY

BACKGROUND OF THE INVENTION

1. Field of the Invention

The present invention relates to a method of and an apparatus for improving the quality of pictures displayed by a picture display apparatus such as a television set, a video projector, or the like.

2. Description of the Related Art

It is known in the art that the quality of pictures displayed by a picture display apparatus such as a television set, a video projector, or the like is reduced by flare. The flare is a phenomenon caused when light leaks from a bright area into a dark area due to light reflections and dispersions in lenses and on illuminated surfaces of a projecting tube or picture tube. The flare results in blurs at edges of displayed pictures across which the luminance difference is large, e.g., a boundary between white and black areas.

FIG. 1 shows an original picture from which a picture is projected onto a screen by a video projector. As shown in FIG. 1, the original picture has a central rectangular white area WT and a black area BL disposed therearound, with the luminance difference being large across an edge ED at the boundary between the white area WT and the black area BL. FIG. 1 also illustrates, below the original picture, a video signal (i.e., luminance signal) representing the original picture horizontally across a central portion thereof. When the original picture is projected onto the screen by the video projector, light leaks from the white area WT into the black area BL, blurring the edge ED. The flare thus caused tends to reduce the quality of the projected picture.

In order to eliminate the above flare, the video signal to be supplied to the video projector is generally digitally processed to correct the picture data out of edge blurring. Such a digital signal process is referred to as flare correction or flare compensation. FIG. 2 shows the concept of flare correction. FIG. 2 shows at (a) the waveform of the video signal of an original picture, which corresponds to the video signal of the original picture shown in FIG. 1. FIG. 2 shows at (b) the luminance distribution of a picture which is projected and displayed on the screen based on the video signal shown at (a) in FIG. 2. FIG. 2 shows at (c) the waveform of a video signal which is produced by effecting flare correction on the video signal shown at (a) in FIG. 2. FIG. 2 shows at (d) the luminance distribution of a picture which is projected and displayed on the screen based on the flare-corrected video signal shown at (c) in FIG. 2.

The picture projected onto the screen by the video projector based on the video signal shown at (a) has its edge blurred by flare as shown at (b) in FIG. 2. In order to correct the picture, the video signal shown at (a) may be corrected or compensated at its positive- and negative-going edges thereof to correct (inversely correct) these edges depending on the blurring at the edges, i.e., to emphasize these edges, as shown at (c). By thus correcting the video signal, it is possible to display the picture free of edge blurs on the screen as shown at (d).

One conventional picture quality improving apparatus disclosed in Japanese laid-open patent publication No. 61-296880 (JP, 61-296880, A) carries out the above flare correction based on a correction signal which is generated from a luminance signal among luminance and color signals (wide-band and narrow-band color signals) which are produced from R (Red), G (Green), and B (Blue) signals as primary color signals. Specific details of the disclosed picture quality improving apparatus will be described below.

FIG. 3 shows in block form the picture quality improving apparatus disclosed in JP, 61-296880, A. As shown in FIG. 3, the picture quality improving apparatus comprises A/D converters 101*a* to 101*c*, matrix circuit 102, compensation delay circuits 103*a* to 103*c*, correction signal generator 104, combiners 105*a* to 105*c*, and D/A converters 106*a* to 106*c*. A/D converters 101*a* to 101*c* are supplied respectively with luminance signal Y, wide-band color signal C1, and narrow-band color signal C2 which are produced from R, G, B signals by an inverse matrix circuit, not shown. A/D converters 101*a* to 101*c* convert the supplied analog signals into digital signals. A/D converter 101*a* supplies its digital output signal to correction signal generator 104 and also to matrix circuit 102. A/D converters 101*b*, 101*c* also supply their digital output signals to matrix circuit 102.

Correction signal generator 104 comprises correction signal generating circuit 106 and delay unit 107 which are supplied with the luminance signal supplied from A/D converter 101*a*, and gain adjusting circuit 108 which is supplied with output signals from correction signal generating circuit 106 and delay unit 107.

Matrix circuit 102 converts luminance signal Y, wide-band color signal C1, and narrow-band color signal C2 supplied respectively from A/D converters 101*a*, 101*b*, 101*c* into R, G, B signals as primary color signals. The R, G, B signals output from matrix circuit 102 are supplied respectively to compensation delay circuits 103*a* to 103*c*.

Combiner 105*a* has an input terminal supplied with the output signal from compensation delay circuit 103*a* and another input terminal supplied with the output signal from gain adjusting circuit 108. Combiner 105*a* outputs a signal which is a combination of the supplied signals to D/A converter 106*a*. Similarly, combiner 105*b* is supplied with the output signal from compensation delay circuit 103*b* and the output signal from gain adjusting circuit 108, and outputs a signal which is a combination of the supplied signals to D/A converter 106*b*. Combiner 105*c* is supplied with the output signal from compensation delay circuit 103*c* and the output signal from gain adjusting circuit 108, and outputs a signal which is a combination of the supplied signals to D/A converter 106*c*.

The picture quality improving apparatus shown in FIG. 3 operates as follows: When a digital luminance signal converted by A/D converter 101*a* is supplied to correction signal generator 104, correction signal generating circuit 106 filters the supplied luminance signal to generate a correction signal. Usually, a picture display apparatus such as a television set, a video projector, or the like is supplied with a nonlinear input signal multiplied by a gamma value because of the characteristics thereof, e.g., the characteristics of cathode-ray tubes (CRTs). If such a nonlinear input signal is filtered into a flare correction signal and such a flare correction signal is added, then the linearity of the flare correction signal itself is lost, lowering the sensitivity of the correction filter in dark picture areas where the signal level is low, with the result that the picture quality cannot sufficiently be improved in such dark picture areas. In order to avoid the above drawback, gain adjusting circuit 108 adjusts the gain of the correction signal generated by correction signal generating circuit 106.

The correction signal whose gain has been adjusted by gain adjusting circuit 108 is supplied to combiners 105*a* to 105*c*. Combiners 105*a* to 105*c* combine the respective R, G, B signals, which have been delayed by respective compensation delay circuits 103*a* to 103*c* for a time equal to the delay time required for correction signal generating circuit 106 to generate the correction signal, with the correction signal whose gain has been adjusted by gain adjusting circuit 108, thus effecting flare correction on the R, G, B signals.

Internal details of correction signal generating circuit 106 are shown in FIG. 4. The picture quality improving apparatus also performs a contour emphasis process for emphasizing the contour of a picture in order to prevent the resolution from being lowered. The contour emphasis process and the flare correction process are concurrently performed in correction signal generating circuit 106. Correction signal generating circuit 106 has a compensation delay unit 125 for generating and delaying a signal 1 for a contour correction filter system, a signal m for a flare correction filter system, and a reference signal n, from the input signal applied to correction signal generating circuit 106. The contour correction filter system comprises vertical contour correction FIR (Finite Impulse Response) filter 121 and horizontal contour correction FIR filter 122 which are connected in cascade, subtractor 126*a* for subtracting a filtered signal from the reference signal n, and coring circuit 127*a* connected to the output terminal of subtractor 126*a*. The flare correction filter system comprises vertical flare correction composite IIR (Infinite Impulse Response) filter 123 and horizontal flare correction composite IIR filter 124 which are connected in cascade, subtractor 126*b* for subtracting a filtered signal from the reference signal n, and coring circuit 127*b* connected to the output terminal of subtractor 126*b*. Correction signal generating circuit 106 also has an adder 128 for adding the output signals from coring circuits 127*a*, 127*b* to each other and outputting the sum signal as the output signal from correction signal generating circuit 106.

Since the present invention is concerned with improving the picture quality based on the flare correction, details of correction signal generating circuit 106 for carrying out the flare correction will be described below. Vertical flare correction composite IIR filter 123 and horizontal flare correction composite IIR filter 124 which are connected in cascade jointly provide a two-dimensional (2D) low-pass filter (LPF). FIG. 5 shows vertical flare correction composite IIR filter 123 in block form, and FIG. 6 shows horizontal flare correction composite IIR filter 124 in block form.

As shown in FIG. 5, vertical flare correction composite IIR filter 123 comprises two low-pass IIR filters 230*a*, 230*b*, and two field inverters 234*a*, 234*b*. Two low-pass IIR filters 230*a*, 230*b* are identical in structure to each other, and a specific circuit arrangement of filter 230*a* among two low-pass IIR filters 230*a*, 230*b* is shown in detail.

Low-pass IIR filter 230*a* comprises delay elements 231*a* to 231*c* which comprise line memories, coefficient circuits 232*a* to 232*d* connected respectively to taps and an input terminal, and adders 233*a* to 233*c*. Coefficient circuit 232*d* is supplied with the luminance signal from A/D converter 101*a* and supplies its output signal to an input terminal of adder 233*a*. Adder 233*a* supplies its output signal to field inverter 234*a*. The output signal from adder 233*a* is also supplied via delay elements 231*a* to 231*c*, which are connected in cascade, to coefficient circuits 232*a* to 232*c* which are supplied with the output signals from delay elements 231*a* to 231*c*. The output signals from coefficient circuits 232*a* to 232*c* are added to each other by adders 233*b*, 233*c*, and the sum signal is supplied to the other input terminal of adder 233*a*. Low-pass IIR filter 230*a* thus arranged serve as a recursive filter.

In vertical flare correction composite IIR filter 123, the output signal from low-pass IIR filter 230*a* is inverted in each field by field inverter 234*a*, which supplies the inverted output signal to low-pass IIR filter 230*b* that is structurally identical to low-pass IIR filter 230*a*. The output signal from low-pass IIR filter 230*b* is inverted in each field by field inverter 234*b*. The delay in phase caused by low-pass IIR filter 230*a* is compensated for because the signal is advanced in phase by low-pass IIR filter 230*b* when the inverted signal is applied thereto. The filter arrangement shown in FIG. 5 provides a good low-pass filter.

As shown in FIG. 6, horizontal flare correction IIR filter 124 comprises two low-pass IIR filters 240*a*, 240*b*, and two line inverters 244*a*, 244*b*. Horizontal flare correction IIR filter 124 is of basically the same structure as vertical flare correction composite IIR filter 123 shown in FIG. 5, but differs therefrom in that line inverters 244*a*, 244*b* are used in place of field inverters 234*a*, 234*b*. Two low-pass IIR filters 240*a*, 240*b* are identical in structure to each other, and each comprises delay elements 241*a* to 241*c* which comprise A/D conversion clock registers, coefficient circuits 242*a* to 242*d* connected respectively to taps and an input terminal, and adders 243*a* to 243*c*. Low-pass IIR filters 240*a*, 240*b* are of basically the same structure as low-pass IIR filters 230*a*, 230*b* shown in FIG. 5 except that delay elements 241*a* to 241*c* are used in place of delay elements 231*a* to 231*c* which comprise line memories.

In addition to JP, 61-87493, A, further picture quality improving apparatuses for carrying out the flare correction and the contour emphasis concurrently with each other are disclosed in JP, 61-87493, A; JP, 61-88663, A; JP, 61-88664, A; JP, 61-88665, A; JP, 61-88667, A; JP, 61-88668, A; JP-88669, A; JP, 61-270987, A; JP, 61-270991, A; JP, 61-270992, A; JP, 61-270993, A; JP, 61-270994, A; JP, 61-270995, A; JP, 61-295786, A; JP, 61-295791, A; JP, 61-295793, A; JP, 61-296879, A; JP, 61-296881, A; JP-296883, A; JP, 61-296884, A. A picture quality improving apparatus which performs the flare correction using a cyclic or acyclic filter is disclosed in JP, 1-246985, A.

In the picture quality improving apparatus disclosed in the publications JP, 61-296880, A, etc., each of vertical flare correction composite IIR filter 123 (FIG. 5) and horizontal flare correction composite IIR filter 124 (FIG. 6) is of an arrangement for inverting data and requires two frame memories. Therefore, these picture quality improving apparatus cannot easily be reduced in cost and size.

The picture quality improving apparatus disclosed in the publications JP, 61-296880, A, etc. employ a 2D LPF which is made up of the vertical flare correction composite IIR filter and horizontal flare correction composite IIR filter that are connected in cascade. However, there are other picture quality improving apparatus which employ composite FIR filters for vertical and horizontal flare correction. These other picture quality improving apparatus are disadvantageous in that their circuit scale is large though no frame memory is required. For example, the vertical flare correction composite FIR filter has an increased number of multipliers and is large in circuit scale as a delay caused for each line is multiplied as a coefficient.

It is known in the art that the visual effects of contour and contrast can be increased by using the Craik-O'Brien effect with respect to visual perception. There have not been known in the art any arrangements which apply the Craik-O'Brien effect to the flare correction. The Craik-O'Brien effect is also known as Craik-Cornsweet illusion, and will be described in detail later on.

The aspect ratio, that is, ratio of frame height to frame width, of picture display apparatus such as a television set has heretofore been 3:4. With the growing popularity of digital high-definition picture contents, picture display apparatus having a screen whose aspect ratio is 9:16 are becoming more and more general. A screen having such an aspect ratio is referred to as "wide screen". However, the conventional picture quality improving apparatus described above are not arranged to be compatible with such picture display apparatus having an aspect ratio of 9:16, and cause the following problems if applied to the picture display apparatus having an aspect ratio of 9:16:

When a picture having an aspect ratio of 3:4 is displayed on a picture display apparatus having a wide screen whose aspect ratio is 9:16, an edge is produced at the boundary between a black area and an effective area of the picture, reducing the quality of the picture. If a picture having an aspect ratio of 3:4 is expanded horizontally or both horizontally and vertically in order to be displayed on the wide screen, then the desired improved effect (flare correction or Craik-O'Brien effect) may not be achieved. If a picture having an aspect ratio of 3:4 is expanded nonlinearly in order to be displayed on the wide screen, then the desired improved effect (flare correction or Craik-O'Brien effect) may not be achieved by expanding the picture after the flare correction has been performed.

SUMMARY OF THE INVENTION

It is an object of the present invention to provide an apparatus for improving the quality of pictures, which is low in cost and small in circuit scale.

Another object of the present invention to provide an apparatus for improving the quality of pictures, which uses the Craik-O'Brien effect with respect to visual perception and is low in cost and small in circuit scale.

Still another object of the present invention to provide an apparatus for improving the quality of pictures, which is compatible with wide screens.

Yet another object of the present invention to provide a method of improving the quality of pictures, which can be carried out at a low cost and with a small circuit scale.

Yet still another object of the present invention to provide a method of improving the quality of pictures, which uses the Craik-O'Brien effect with respect to visual perception and can be carried out at a low cost and with a small circuit scale.

A further object of the present invention to provide a method of improving the quality of pictures, which is compatible with wide screens.

According to a first aspect of the present invention, there is provided an apparatus for improving the quality of a picture, comprising a two-dimensional (2D) low-pass filter (LPF) for being supplied with a luminance signal obtained from a video signal and extracting, from the supplied luminance signal, low-frequency components in vertical and horizontal directions of a picture displayed based on the video signal, a subtractor for subtracting the low-frequency components extracted by the 2D LPF from the luminance signal thereby to generate an edge signal, and an adder for adding the edge signal generated by the subtractor to the luminance signal, the 2D LPF comprising a vertical LPF for extracting the low-frequency component in the vertical direction and a horizontal LPF for extracting the low-frequency component in the horizontal direction.

Each of the vertical and horizontal LPFs has an FIR (finite impulse response) filter and an IIR (infinite impulse response) filter which are connected in cascade, or an FIR filter and an IIR filter which are connected parallel to each other.

According to a second aspect of the present invention, there is provided a method of improving the quality of a picture, comprising the steps of extracting low-frequency components in vertical and horizontal directions of a picture displayed based on a video signal from a luminance signal obtained from the video signal, and producing extracted low-frequency signals, subtracting the extracted low-frequency component signals from the luminance signal thereby to generate an edge signal representing an edge corresponding to a contour of the picture and having a level and a slope of predetermined magnitudes, and adding the edge signal to the luminance signal.

With above arrangement of the present invention, each of the vertical and horizontal LPFs of the 2D LPF comprises an FIR filter and an IIR filter which are connected in cascade or parallel to each other. The impulse responses of the FIR and IIR filters are combined with each other to provide an LPF of phase linearity. The 2D LPF thus arranged dispenses with frame memories which have heretofore been employed. Since a single FIR filter is used in each of the vertical and horizontal LPFS, the 2D LPF is smaller in circuit scale than the conventional LPF having a composite FIR filter for vertical flare correction.

Of the edge of the edge signal, the level and slope of the edge corresponding to the contour of the picture displayed based on the video signal are set to given magnitudes, i.e., conditions to achieve the Craik-O'Brien effect, for thereby increasing the visual effect of contour and contrast. The Craik-O'Brien effect can be accomplished by coefficient units and gain adjusting circuits of the FIR and IIR filters of each of the vertical and horizontal LPFs, without the need for any special arrangements.

If the edge signal held to a certain value in a black area is output, then any edges responsible for a reduction in the picture quality at boundaries between black and effective areas are not produced.

If the horizontal LPF which is arranged to have response characteristics shorter by a predetermined picture magnification ratio than the response characteristics to be provided if the picture is not expanded, is used to extract the low-frequency component in the horizontal direction, sufficiently improved effects with respect to flare correction and the Craik-O'Brien effect are obtained even when the picture is expanded horizontally. Similarly, if the vertical and horizontal LPFs which are arranged to have respective response characteristics shorter by predetermined picture magnification ratios than the response characteristics to be provided if the picture is not expanded, are used to extract the low-frequency component in the vertical and horizontal directions, sufficiently improved effects with respect to flare correction and the Craik-O'Brien effect are obtained even when the picture is expanded both vertically and horizontally.

According to the present invention, furthermore, by nonlinearly expanding the picture displayed based on the video signal before the edge is detected, sufficiently improved effects with respect to flare correction and the Craik-O'Brien effect are obtained even when the picture is expanded nonlinearly.

The above and other objects, features, and advantages of the present invention will become apparent from the following description with reference to the accompanying drawings which illustrate examples of the present invention.

DETAILED DESCRIPTION OF THE INVENTION

First Embodiment: Flare Correction

Figure 7:
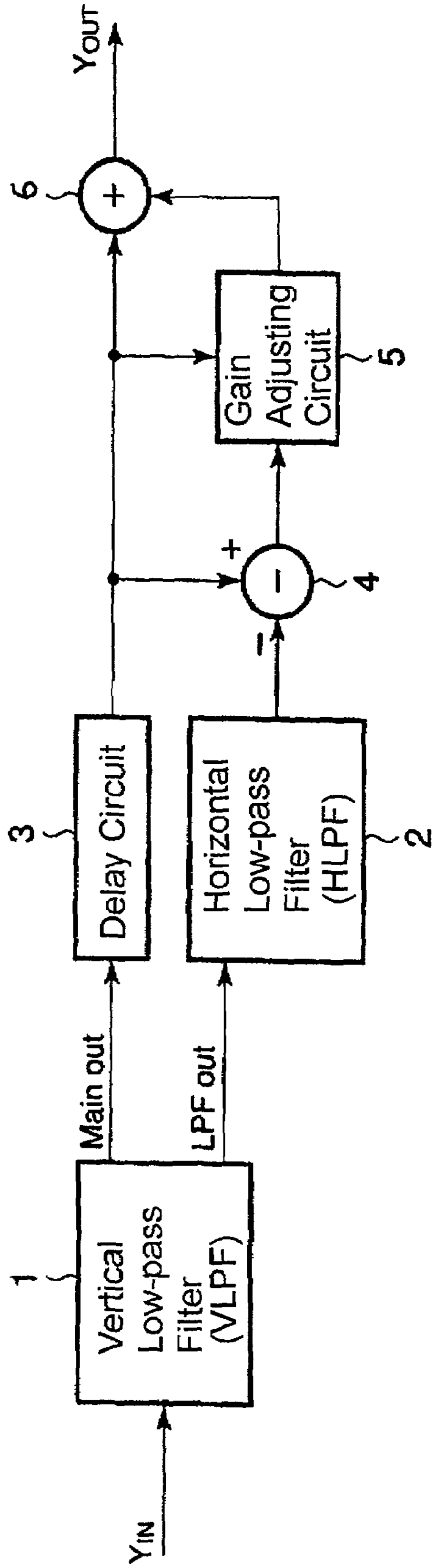
FIG. 7 is a block diagram of a picture quality improving apparatus according to a first embodiment of the present invention.

FIG. 7 shows a picture quality improving apparatus according to a first embodiment of the present invention. The picture quality improving apparatus shown in FIG. 7 generates a flare correction signal from a luminance signal among luminance and color signals which are produced from R, G, B signals as primary color signals, and adds the flare correction signal to the original luminance signal for performing flare correction. The picture quality improving apparatus comprises vertical low-pass filter (VLPF) 1, horizontal low-pass filter (HLPF) 2, delay circuit 3, subtractor 4, gain adjusting circuit 5, and adder 6.

VLPF 1 has two output terminals, i.e., an output terminal "Main out" for directly outputting a luminance signal $Y_{IN}$ which is obtained from R, G, B signals and supplied thereto, and an output terminal "LPF out" for extracting a vertical low-frequency component of the supplied luminance signal $Y_{IN}$ and outputting the extracted vertical low-frequency component. The output signal in the output terminal "Main out" is supplied to delay circuit 3, and the output signal in the output terminal "LPF out" is supplied to HLPF 2.

Delay circuit 3 delays the supplied signal for a time corresponding to the time required for VLPF 1 and HLPF 2 to filter the signal. Delay circuit 3 supplies the delayed output signal to a "plus (+)" input terminal of subtractor 4, an input terminal of gain adjusting circuit 5, and an input terminal of adder 6.

HLPF 2 extracts a horizontal low-frequency component from the output in the output terminal "LPF out" from VLPF 1, i.e., the vertical low-frequency component of the luminance signal $Y_{IN}$. VLPF 1 and HLPF 2 jointly make up a flare correction two-dimensional (2D) low-pass filter (LPF). The output signal, i.e., the extracted horizontal low-frequency component, from HLPF 2 is supplied to a "minus (−)" input terminal of subtractor 4.

Subtractor 4 subtracts the horizontal low-frequency component (the output signal of the 2D LPF), which is supplied from HLPF 2 to the "−" input terminal thereof, from the original luminance signal which is supplied from delay circuit 3 to the "+" input terminal of subtractor 4, and supplies an edge signal, which represents the difference, to gain adjusting circuit 5.

Figure 3:
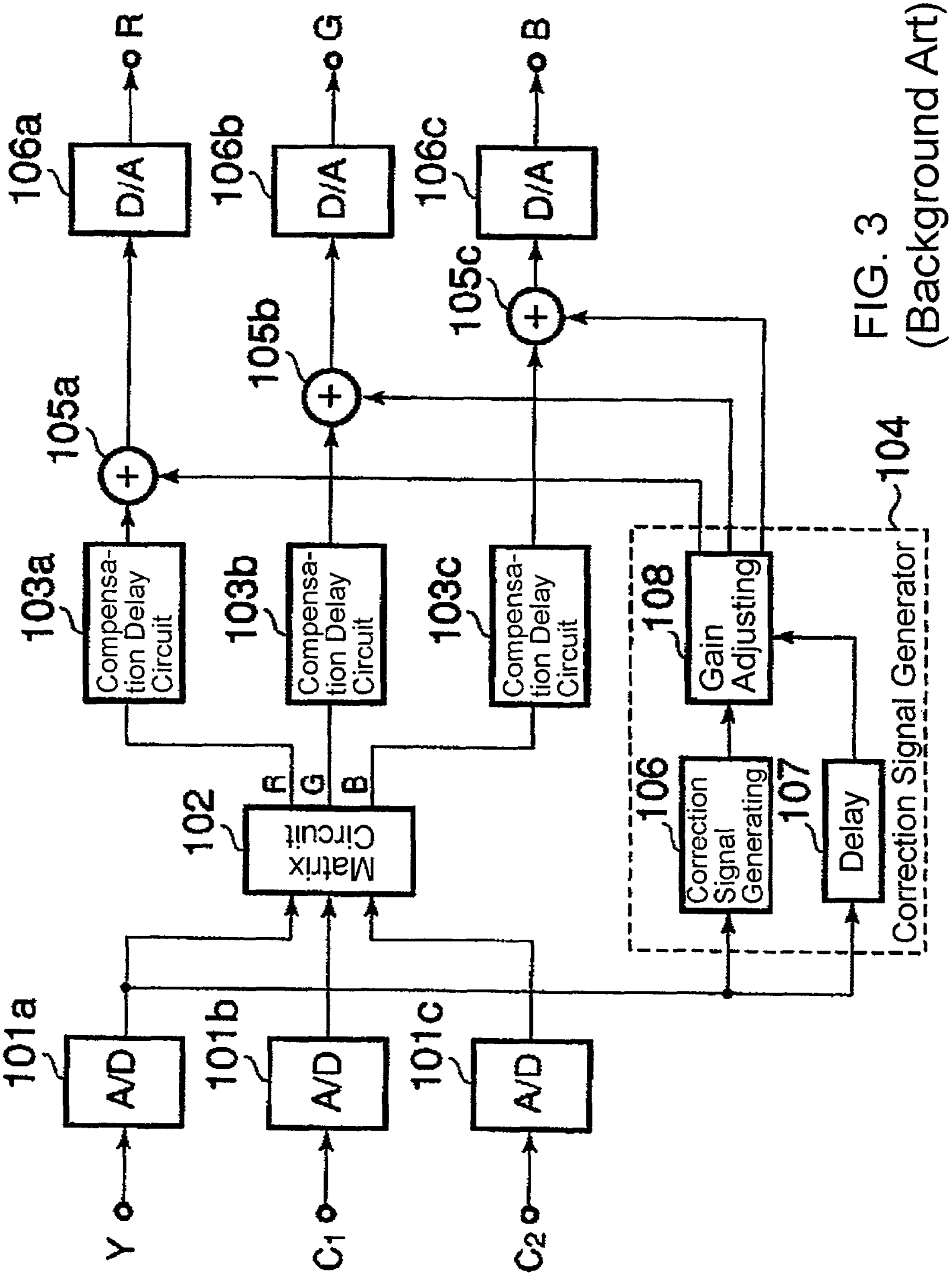
FIG. 3 is a block diagram of an example of a conventional picture quality improving apparatus.
Figure 4:
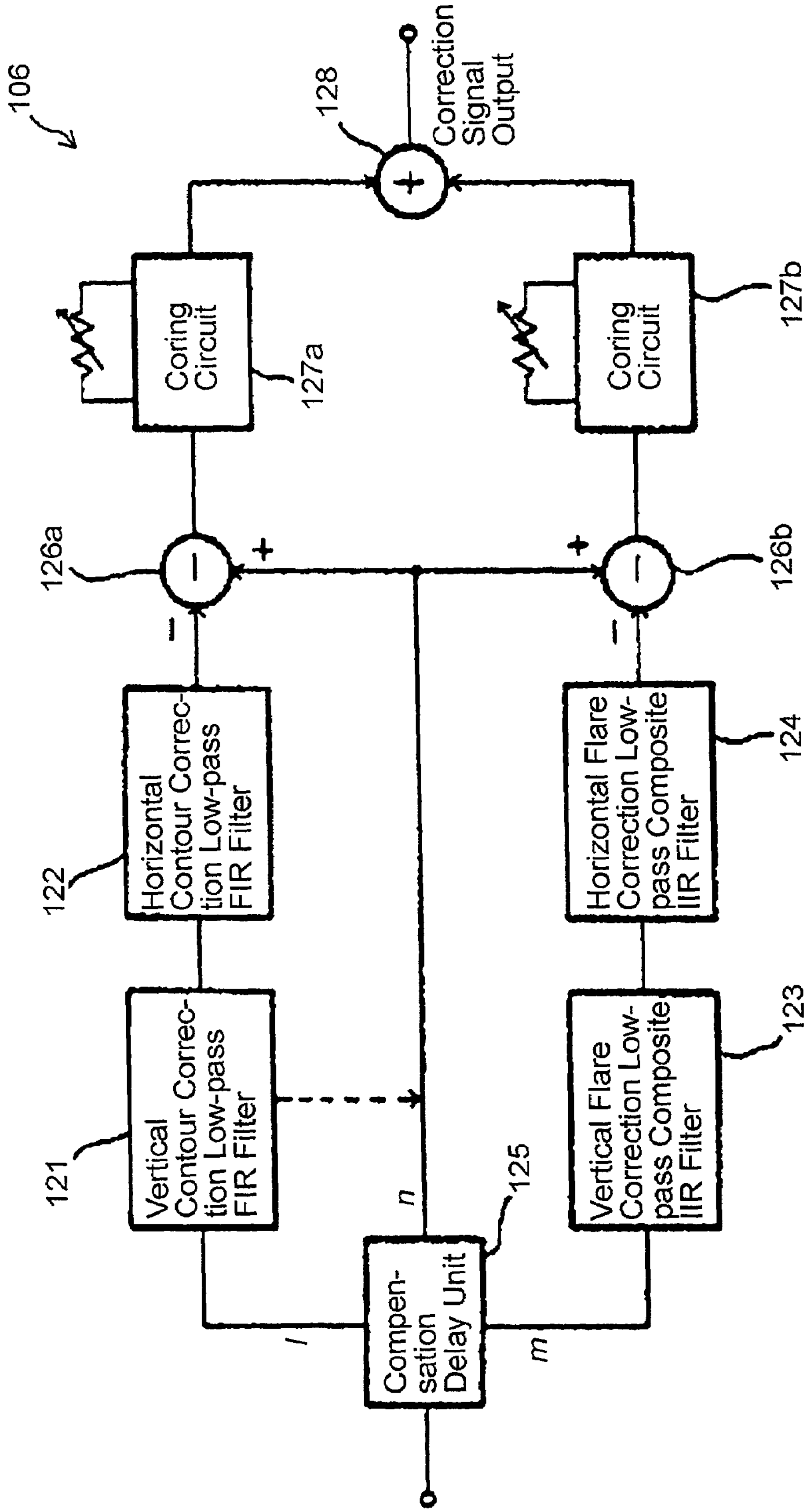
FIG. 4 is a block diagram of a correction signal generating circuit used in the conventional picture quality improving apparatus shown in FIG. 3.
Figure 5:
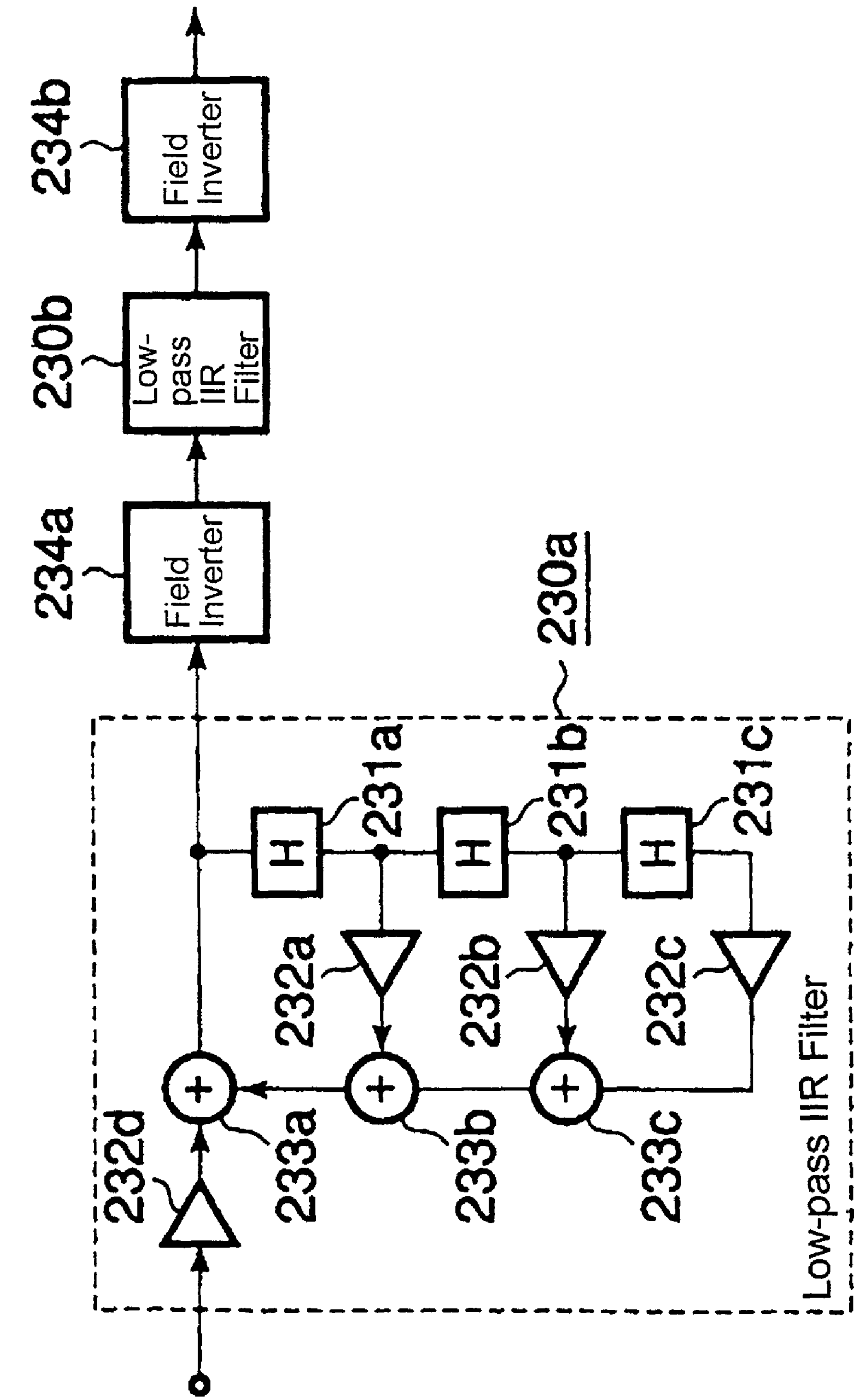
FIG. 5 is a block diagram of a vertical flare correction composite IIR filter used in the correction signal generating circuit shown in FIG. 4.
Figure 6:
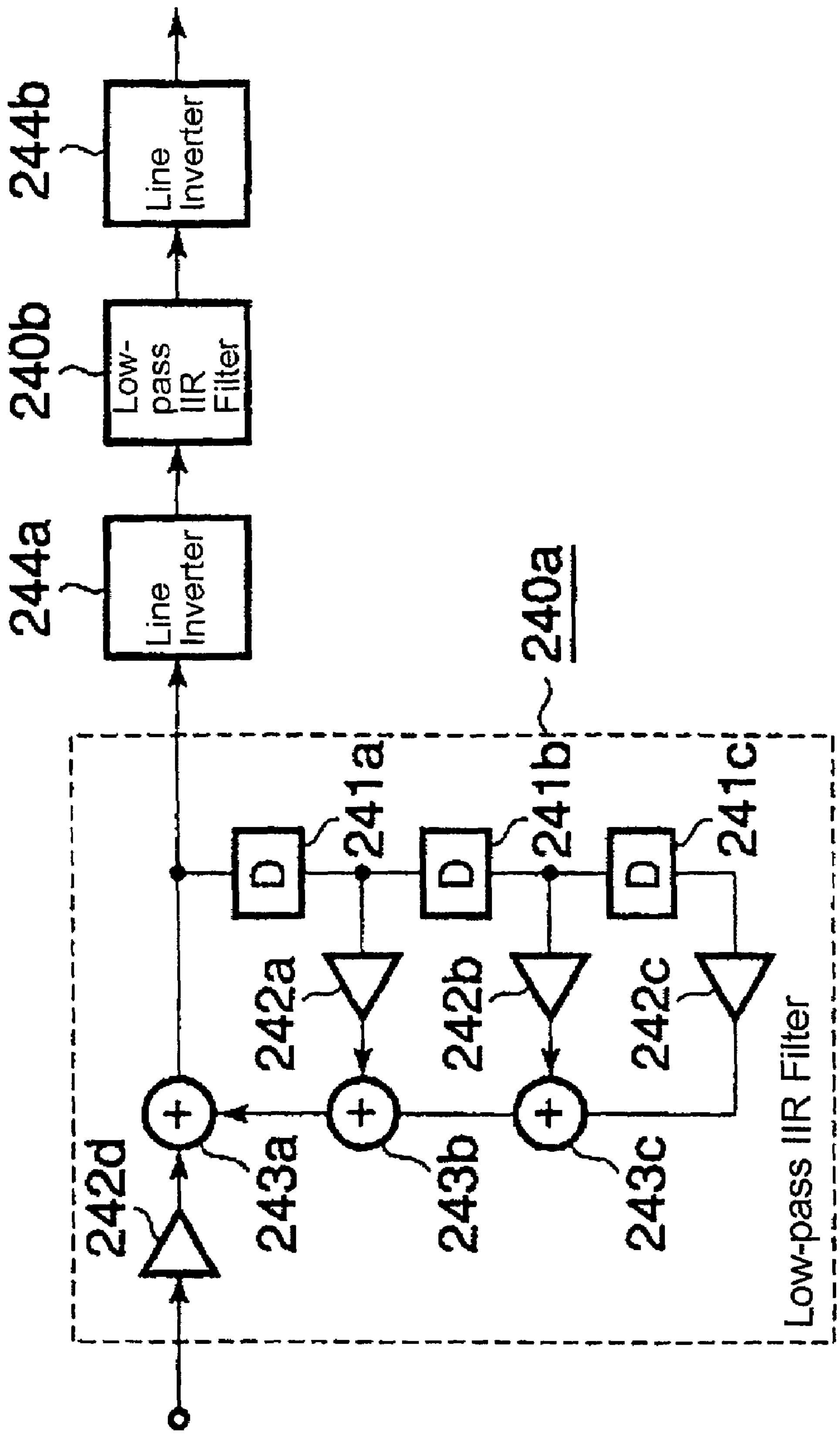
FIG. 6 is a block diagram of a horizontal flare correction composite IIR filter used in the correction signal generating circuit shown in FIG. 4.

Gain adjusting circuit 5 serves to prevent the sensitivity of the flare correction filter from being lowered in dark picture areas where the signal level is low, when a nonlinear signal multiplied by a gamma value is supplied thereto, as with the conventional gain adjusting circuit shown in FIG. 3. The flare correction filter is the 2D LPF made up of VLPF 1 and HLPF 2. The output signal from gain adjusting circuit 5, i.e., the edge signal whose gamma characteristics have been compensated into the linear characteristics, is supplied to the other input terminal of adder 6.

Adder 6 adds the edge signal whose gain has been adjusted by gain adjusting circuit 5 to the original luminance signal supplied from delay circuit 3, and outputs the sum as a luminance signal $Y_{OUT}$.

With the picture quality improving apparatus thus arranged, the luminance signal $Y_{IN}$ is supplied to VLPF 1, which extracts the vertical low-frequency component from the luminance signal $Y_{IN}$, and further supplied to HLPF 2, which extracts the horizontal low-frequency component from the luminance signal $Y_{IN}$. The luminance signal $Y_{IN}$ is also supplied to delay circuit 3, which delays the luminance signal $Y_{IN}$.

The extracted low-frequency signal, which represent the vertical and horizontal low-frequency components extracted by VLPF 1 and HLPF 2, is supplied to the "−" input terminal of subtractor 4. The original luminance signal which has been delayed by delay circuit 3 is supplied to the "+" input terminal of subtractor 4. Subtractor 4 subtracts the extracted low-frequency signal supplied to the "−" input terminal from the original luminance signal supplied to the "+" input terminal, thus producing an edge signal.

Figure 1:
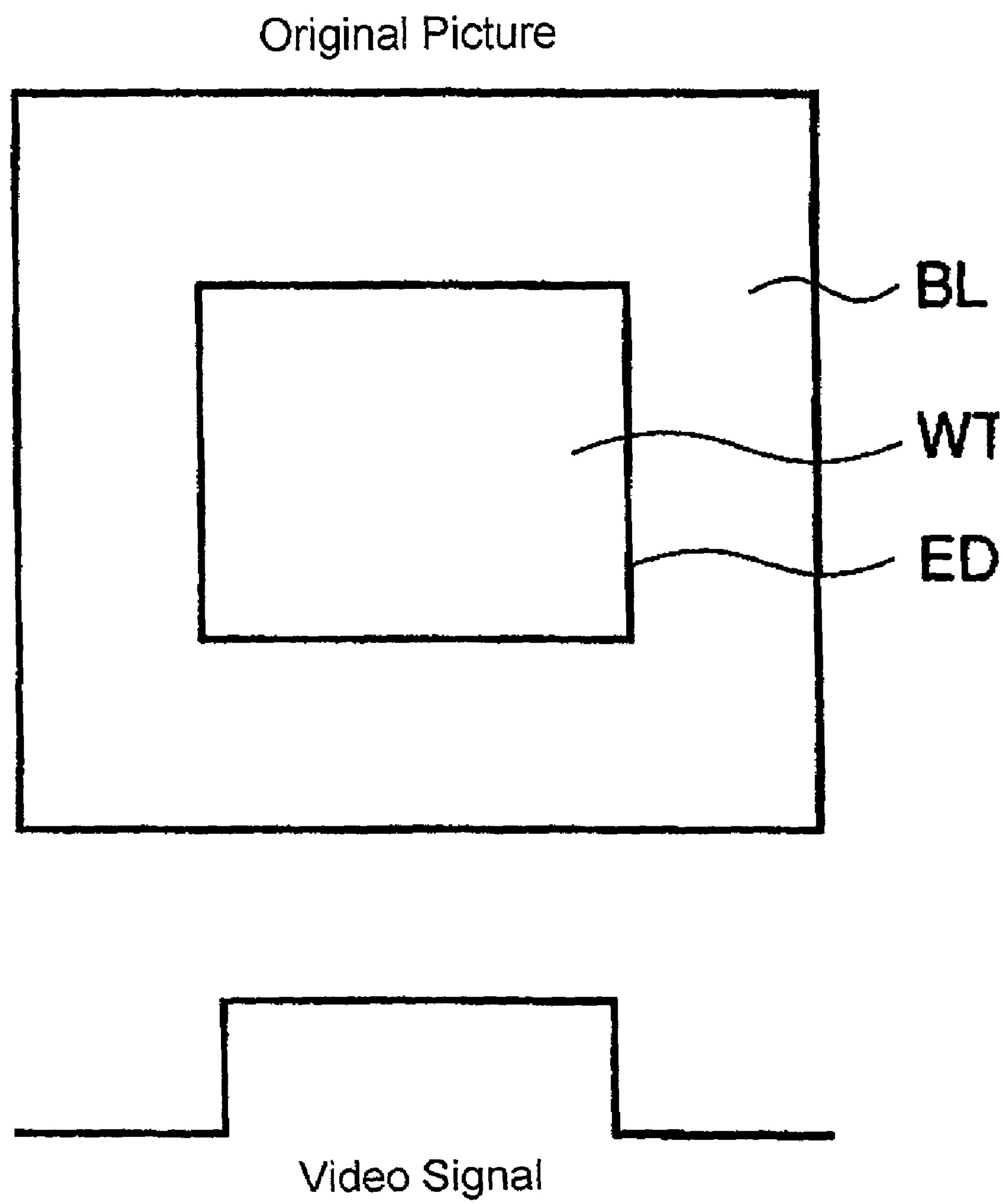
FIG. 1 is a diagram showing an example of an original picture from which a picture is projected onto a screen by a video projector.
Figure 2:
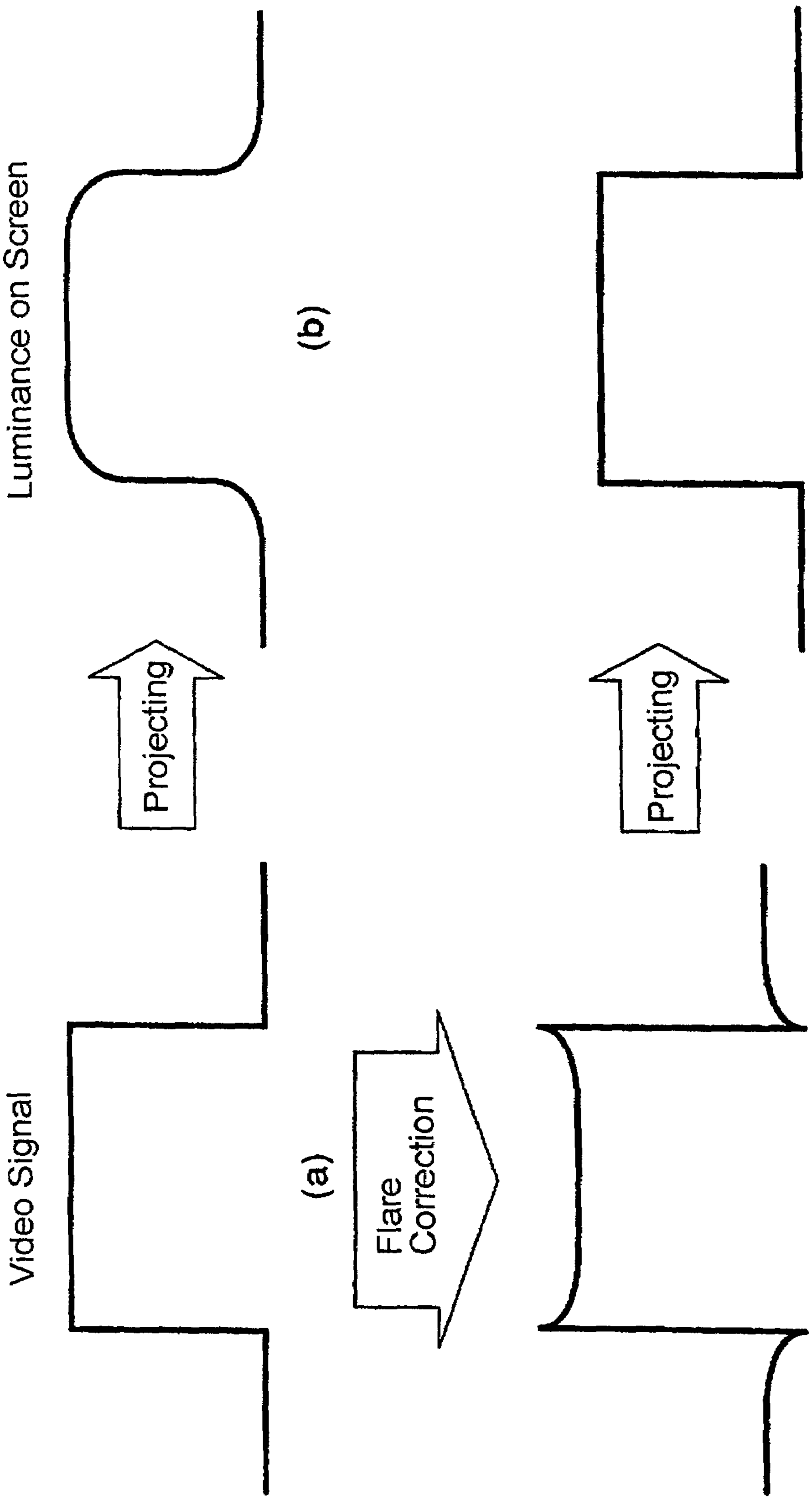
FIG. 2 is a diagram of the concept of flare correction, showing at (a) the waveform of the video signal of an original picture, at (b) the luminance distribution of a picture which is projected and displayed on the screen based on the video signal shown at (a), at (c) the waveform of a video signal which is produced by effecting flare correction on the video signal shown at (a), and at (d) the luminance distribution of a picture which is projected and displayed on the screen based on the flare-corrected video signal shown at (c)
Figure 8A:
FIG. 8A is a diagram showing the waveform of an edge signal.
Figure 8B:
FIG. 8B is a diagram showing the waveform of an original video signal.

FIG. 8A shows the waveform of the edge signal, and FIG. 8B shows the waveform of the original video signal. The edge signal shown in FIG. 8A corresponds to the horizontal edge ED of the original picture shown in FIG. 1, and the video signal shown in FIG. 8B corresponds to the video signal of the original picture shown in FIG. 1. When the edge signal and the original video signal are added to each other, the signal waveform shown at (c) in FIG. 2 which has been corrected for flare is obtained. The luminance signal $Y_{OUT}$ output from adder 6 and the color signal (wide-band and narrow-band color signals) which are produced from R, G B signals as primary color signals are supplied to a known matrix circuit (not shown), which re-converts them into R, G, B signals as primary color signals. A picture display apparatus then displays a picture based on the re-converted R, G, B signals.

The present invention resides in VLPF 1 and HLPF 2 of the picture quality improving apparatus. VLPF 1 and HLPF 2 will be described below in detail below.

Figure 9A:
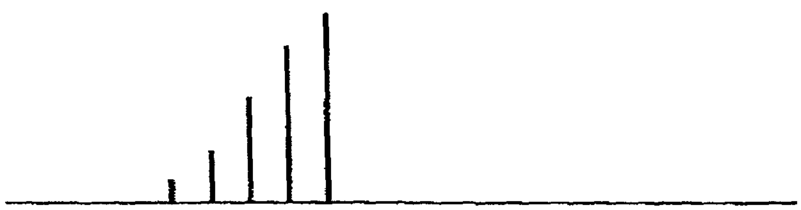
FIG. 9A is a diagram showing the impulse response of an FIR filter.
Figure 9B:
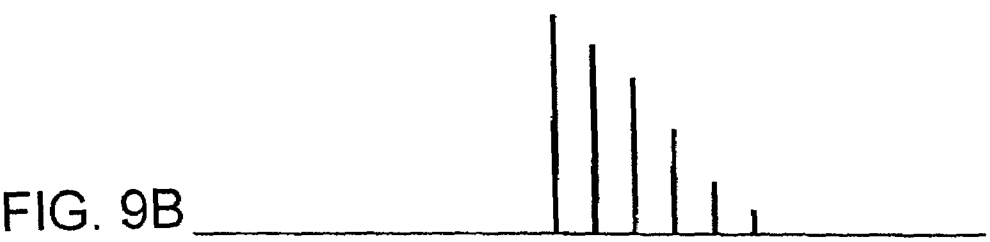
FIG. 9B is a diagram showing the impulse response of an IIR filter.
Figure 9C:
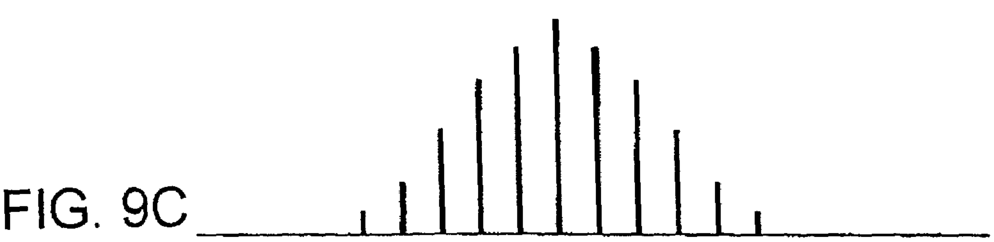
FIG. 9C is a diagram showing the impulse response of an LPF.

VLPF 1 and HLPF 2 may comprise an FIR (finite impulse response) filter and an IIR (infinite impulse response) filter which are connected in cascade, or may comprise an FIR filter and an IIR filter which are connected parallel to each other. FIG. 9A shows the impulse response of an FIR filter, FIG. 9B the impulse response of an IIR filter, and FIG. 9C the impulse response of an LPF. If an LPF comprises an FIR filter and an IIR filter which are connected in cascade, then the impulse response shown in FIG. 9C is obtained by convoluting the impulse response (FIG. 9A) of the FIR filter and the impulse response (FIG. 9B) of the IIR filter. If an LPF comprises an FIR filter and an IIR filter which are connected parallel to each other, then the impulse response shown in FIG. 9C is obtained by adding the impulse response (FIG. 9B) of the IIR filter to the impulse response (FIG. 9A) of the FIR filter.

Specific details of VLPF 1 and HLPF 2 will be described below.

Figure 10:
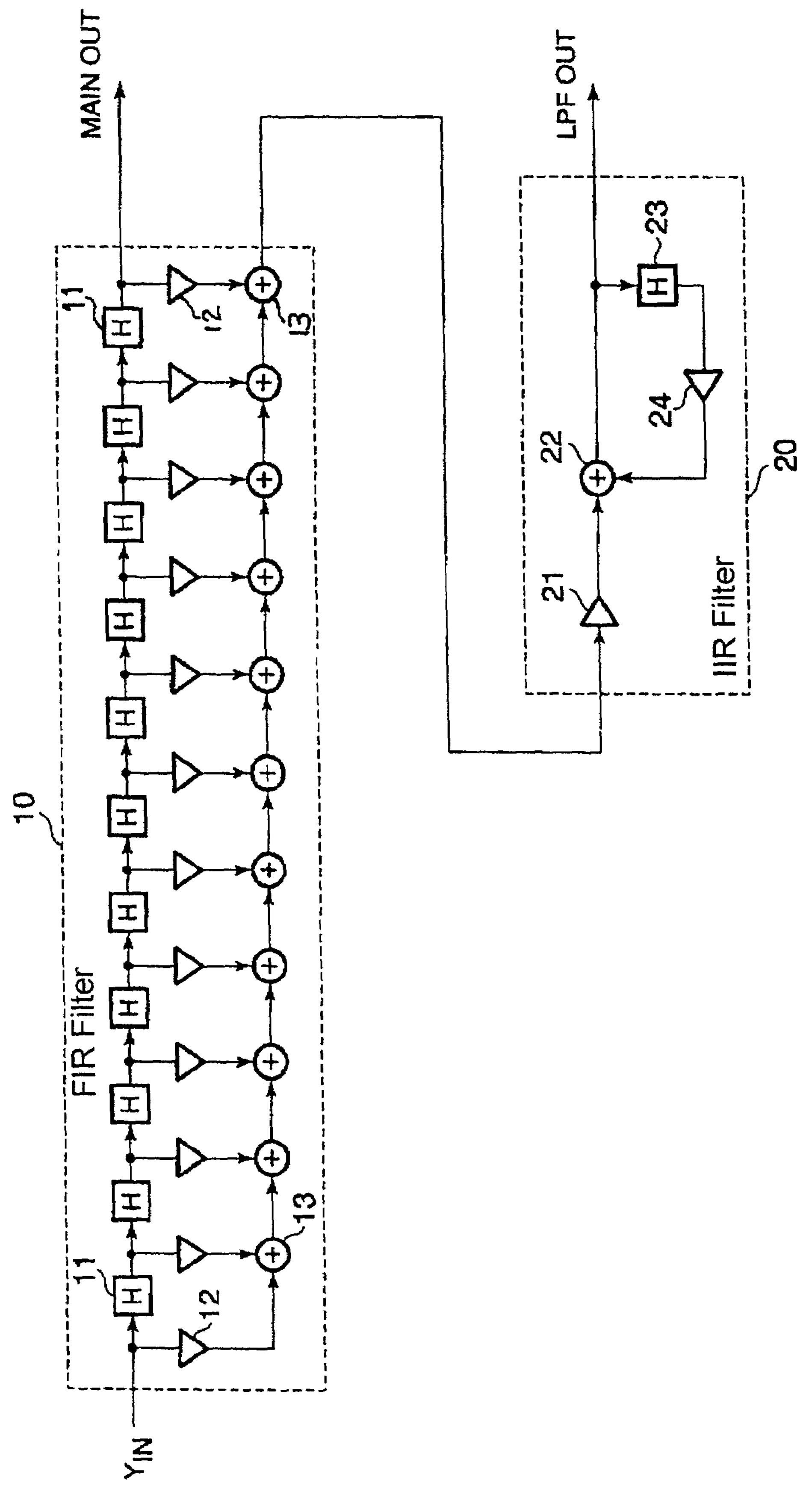
FIG. 10 is a block diagram of a vertical LPF (VLPF) in the picture quality improving apparatus shown in FIG. 7.

(1-a) VLPF Comprising FIR Filter and IIR Filter Connected in Cascade:

FIG. 10 shows by way of example VLPF 1 used in the picture quality improving apparatus shown in FIG. 7. As shown in FIG. 10, the VLPF comprises 12-tap FIR filter 10 and 1-tap IIR filter 20 which are connected in cascade.

FIR filter 10 comprises eleven cascaded delay elements (line memories) 11 supplied with the luminance signal $Y_{IN}$, twelve coefficient units 12 supplied with the luminance signal $Y_{IN}$ and the output signals from delay elements 11, and eleven adders 13 for adding the output signals from coefficient units 12. In FIG. 10, each of the delay elements which comprise line memories is represented by "H". The output terminal of eleventh delay element 11 is branched into a line connected to eleventh adder 13 and a line connected to the output terminal "Main out". The output signal from eleventh adder 13 serves as the output signal from FIR filter 10.

IIR filter 20 comprises two coefficient units 21, 24, adder 22, and delay element 23 which is a line memory. Coefficient unit 21 is supplied with the output signal from FIR filter 10, and supplies its output signal to an input terminal of adder 22. Adder 22 has its output terminal branched into a line connected to the output terminal "LPF out" and a line connected to delay element 23. Delay element 23 supplies its output signal via coefficient unit 24 to another input terminal of adder 22.

Figure 11:
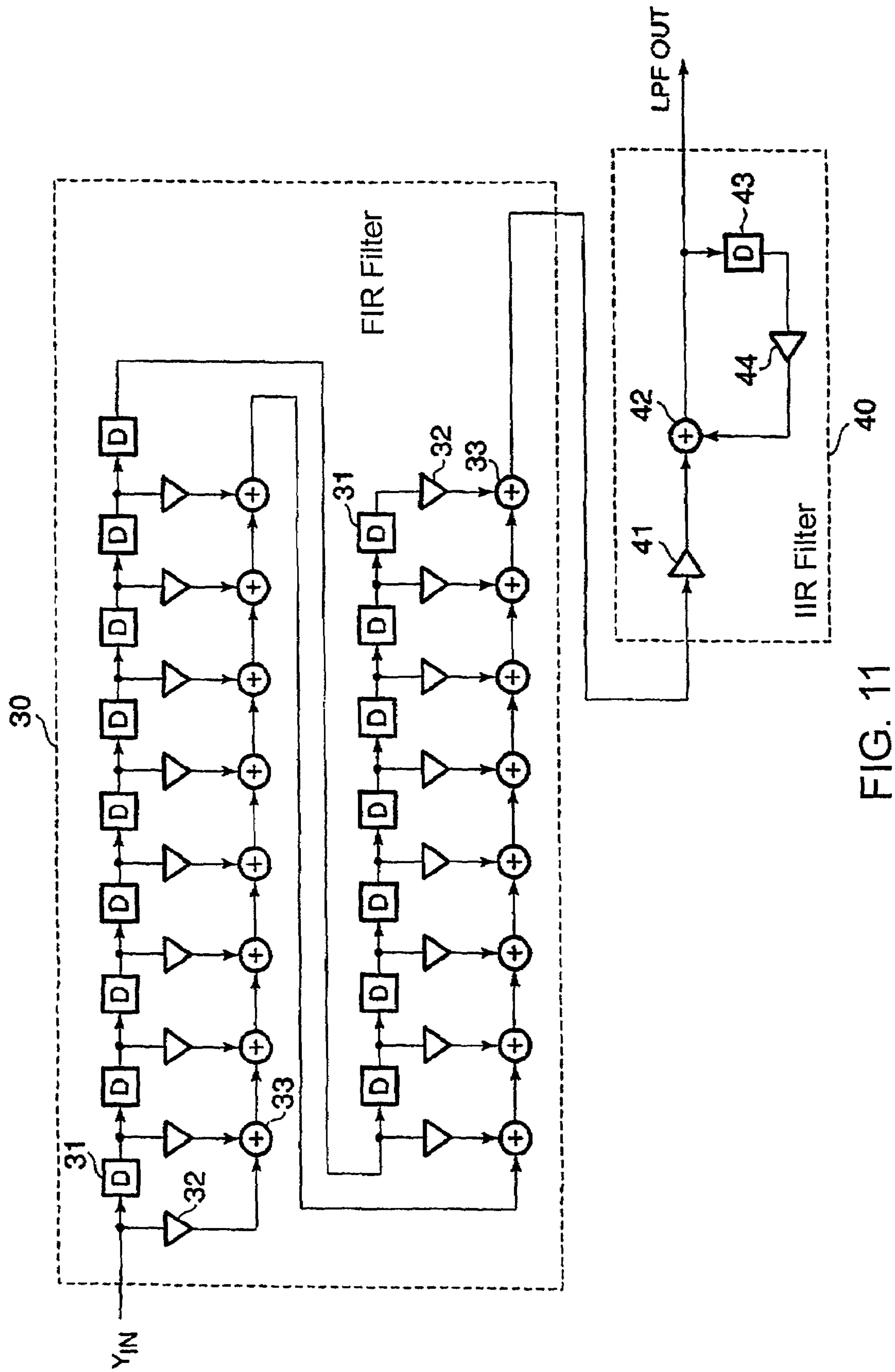
FIG. 11 is a block diagram of a horizontal LPF (HLPF) in the picture quality improving apparatus shown in FIG. 7.

(1-b) HLPF Comprising FIR Filter and IIR Filter Connected in Cascade:

FIG. 11 shows by way of example HLPF 2 used in the picture quality improving apparatus shown in FIG. 7. As shown in FIG. 11, the HLPF comprises 17-tap FIR filter 30 and 1-tap IIR filter 40 which are connected in cascade.

FIR filter 30 comprises sixteen cascaded delay elements (registers) 31 supplied with the luminance signal $Y_{IN}$ which is output from the VLPF described above in (1-a), seventeen coefficient units 32 supplied with the luminance signal $Y_{IN}$ and the output signals from delay elements 31, and sixteen adders 33 for adding the output signals from coefficient units 32. In FIG. 11, each of the delay elements which comprise registers is represented by "D". The output signal from sixteenth adder 33 serves as the output signal from FIR filter 30.

IIR filter 40 comprises two coefficient units 41, 44, adder 42, and delay element (register) 43. Coefficient unit 41 is supplied with the output signal from FIR filter 30 and supplies its output signal to an input terminal of adder 42. The output terminal of adder 42 is branched into a line connected to the output terminal "LPF out" and a line connected to delay element 43. Delay element 43 supplies its output signal via coefficient unit 44 to another input terminal of adder 42.

Figure 12:
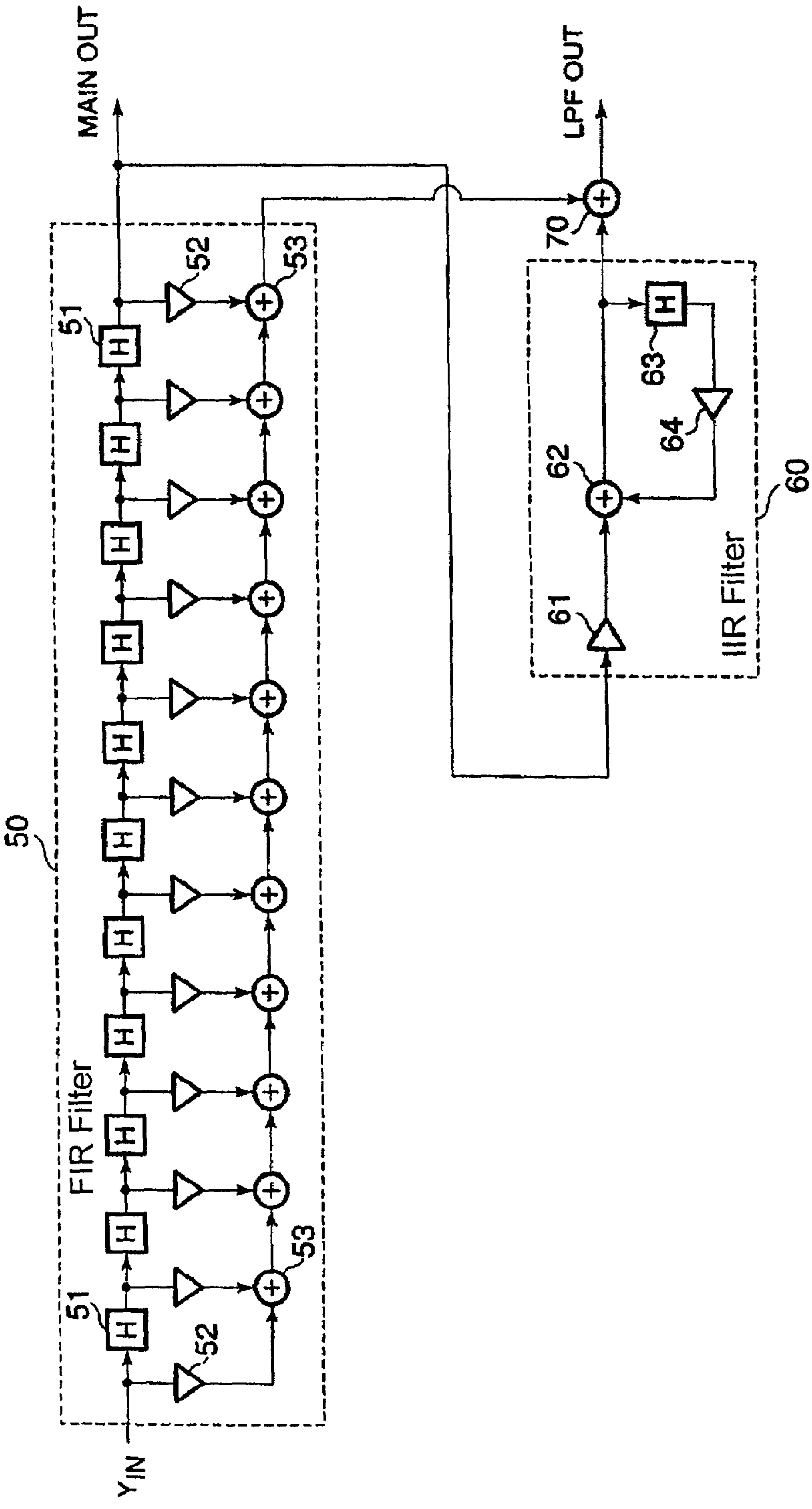
FIG. 12 is a block diagram of another VLPF.

(2-a) VLPF Comprising FIR Filter and IIR Filter Connected Parallel to Each Other:

FIG. 12 shows another example of VLPF 1 used in the picture quality improving apparatus shown in FIG. 7. As shown in FIG. 12, the VLPF comprises 12-tap FIR filter 50, 1-tap IIR filter 60, and adder 70 for adding the output signals from FIR filter 50 and IIR filter 60 to each other.

FIR memory 50 comprises eleven cascaded delay elements (line memories) 51 supplied with the luminance signal $Y_{IN}$ twelve coefficient units 52 supplied with the luminance signal $Y_{IN}$ and the output signals from delay elements 51, and eleven adders 53 for adding the output signals from coefficient units 52. The output terminal of eleventh delay element 51 is branched into a line connected to eleventh adder 53 and a line connected to the output terminal "Main out". The output signal from eleventh adder 53 serves as the output signal from FIR filter 50.

IIR filter 60 comprises two coefficient units 61, 64, adder 62, and delay element 63 which is a line memory. Coefficient unit 61 is supplied with the output signal from FIR filter 50, and supplies its output signal to an input terminal of adder 62. Adder 62 has its output terminal branched into a line connected to the output terminal "LPF out" via adder 70 and a line connected to delay element 63. Delay element 63 supplies its output signal via coefficient unit 64 to another input terminal of adder 62. Adder 70 adds the output signal of the eleventh adder 53 of FIR filter 50 to the output signal of adder 62 of IIR filter 60.

Figure 13:
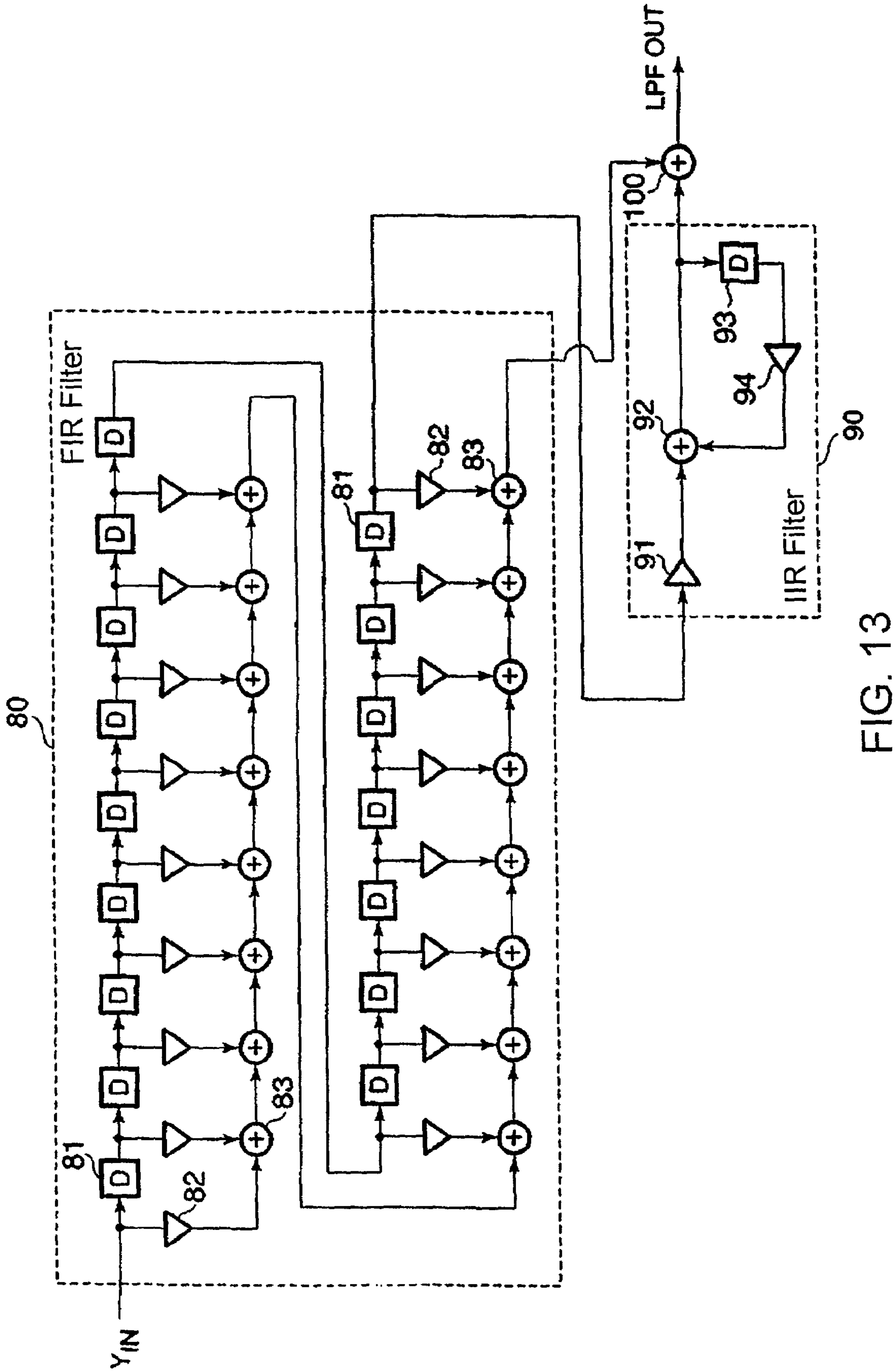
FIG. 13 is a block diagram of another HLPF.

(2-b) HLPF Comprising FIR Filter and IIR Filter Connected Parallel to Each Other:

FIG. 13 shows another example of HLPF 2 used in the picture quality improving apparatus shown in FIG. 7. As shown in FIG. 13, the HLPF comprises 17-tap FIR filter 80, 1-tap IIR filter 90, and adder 100 for adding the output signals from FIR filter 80 and IIR filter 90 to each other.

FIR filter 80 comprises sixteen cascaded delay elements (registers) 81 supplied with the luminance signal $Y_{IN}$ which is output from the VLPF described above in (2-a), seventeen coefficient units 82 supplied with the luminance signal $Y_{IN}$ and the output signals from delay elements 81, and sixteen adders 83 for adding the output signals from coefficients units 82. The output signal from sixteenth adder 83 serves as the output signal from FIR filter 80.

IIR filter 90 comprises two coefficient units 91, 94, adder 92, and delay element (register) 93. Coefficient unit 91 is supplied with the output signal from FIR filter 80 and supplies its output signal to an input terminal of adder 92. The output terminal of adder 92 is branched into a line connected to the output terminal "LPF out" via adder 100 and a line connected to delay element 93. Delay element 93 supplies its output signal via coefficient unit 94 to another input terminal of adder 92. Adder 100 adds the output signal of the sixteenth adder 83 of FIR filter 80 to the output signal of adder 92 of IIR filter 90.

Second Embodiment: Use of Visual Illusion

The Craik-O'Brien effect with respect to visual perception can be used to increase the visual effects of contour and contrast for improving the quality of pictures. The Craik-O'Brien effect represents a visual illusion that a wide edge provided in an area free of any luminance difference makes the viewer see a luminance difference. Details of the Craik-O'Brien effect are described in, for example, Japan Television Society Technical Reports (Nov. 24, 1977, VVI 24–2, pp. 7–13). The picture quality improving apparatus according to the present embodiment relies upon the Craik-O'Brien effect to increase the visual effects of contour and contrast. The picture quality improving apparatus according to the present embodiment is of basically the same construction of the picture quality improving apparatus according to the first embodiment. Principles and arrangements for achieving the Craik-O'Brien effect will be described below.

Figure 14:
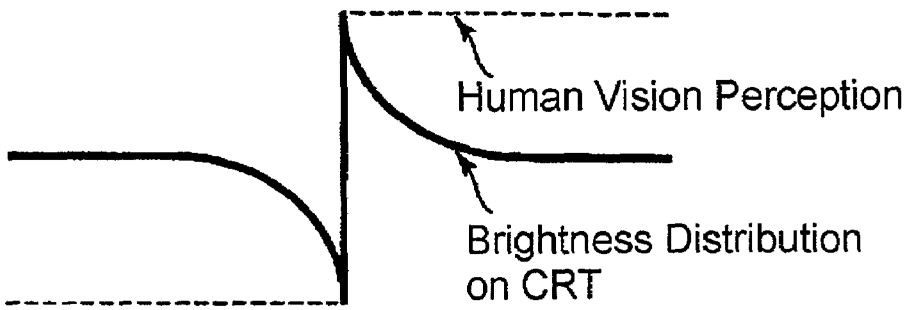
FIG. 14 is a diagram illustrative of the visual effect of contrast based on the Craik-O'Brien effect.

FIG. 14 is illustrative of the visual effect of contrast based on the Craik-O'Brien effect. Assuming that an edge signal as shown in FIG. 14 is displayed on the screen of a CRT or the like, the human vision perceives a step pattern of bright and dark areas as indicated by the dotted lines when a certain condition is satisfied. This visual perception is caused by an illusion according to the Craik-O'Brien effect. The illusion occurs if the contrast (degree of modulation) of the edge is of a low value in the range of 10 to 20% of the average luminance of the screen. The Craik-O'Brien effect is also governed by the size of the slope of the edge as well as the low contrast. Using an edge signal representing a wide edge having a large slope, it is possible to effectively achieve the visual effect of contrast according to the Craik-O'Brien effect.

In order to obtain the visual effect of contrast according to the Craik-O'Brien effect, the signal produced by subtracting the extracted low-frequency signal (representing a blurred picture) output from the 2D LPF made up of VLPF 1 and HLPF 2 from the original video signal (original picture) output from delay circuit 3, i.e., the edge signal (the output signal from subtractor 4), is to satisfy the conditions for the visual illusion, i.e., the low contract condition and the size of the slope of the edge. When a picture is displayed based on video signals (R, G, B signals), the level and the size of the slope of the edge represented by the edge signal output from subtractor 4 and corresponding to the contour of the displayed picture are set to such values as to cause visual illusion according to the Craik-O'Brien effect.

The low contrast can be achieved by adjusting the gain with gain adjusting circuit 5. The slope of the edge is determined by the coefficient units (i.e., filter coefficients) of VLPF 1 and HLPF 2. In the present embodiment, the edge signal whose gain has been adjusted by gain adjusting circuit 5 is established to satisfy the low contrast condition that the contrast of the edge is of a low value in the range of 10 to 20% of the average luminance of the screen, and the slope of the edge is established so as to be large, for thereby increasing the visual effect according to the Craik-O'Brien effect.

Figure 15:
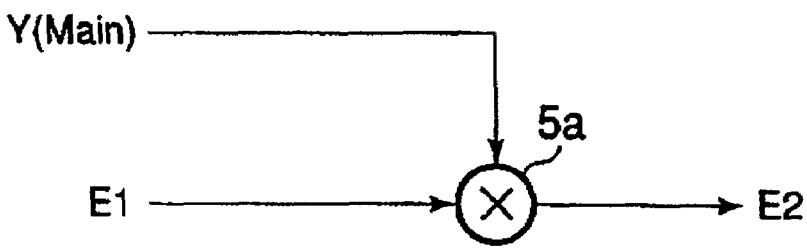
FIG. 15 is a block diagram of a gain adjusting circuit in the picture quality improving apparatus shown in FIG. 7.
Figure 16:
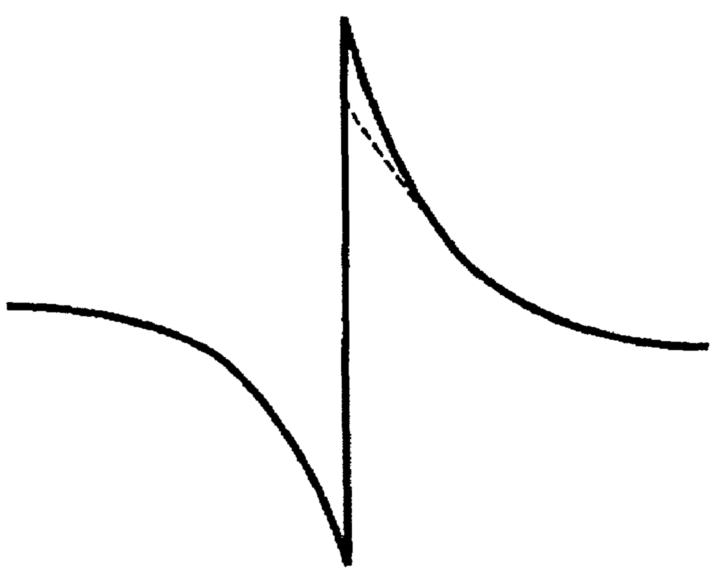
FIG. 16 is a diagram showing a waveform illustrative of an edge gain adjustment made by the gain adjusting circuit shown in FIG. 15.

In the present embodiment, gain adjusting circuit 5 operates to adjust the gamma characteristics into linear characteristics, in the same manner as described above with respect to the first embodiment. FIG. 15 shows a circuit arrangement of gain adjusting circuit 5 in the present embodiment. As shown in FIG. 15, gain adjusting circuit 5 has multiplier 5*a* supplied with an edge signal E1 output from subtractor 4. Multiplier 5*a* is supplied with the original luminance signal Y output from delay circuit 3, as a control signal for determining which level the output signal from subtractor 4 is to be set to. Multiplier 5*a* thus changes the level of the output signal (edge) of subtractor 4 depending on the brightness represented by luminance signal Y. Though not shown in FIG. 15, the luminance signal Y and the edge signal E1 are compensated for delays. The circuit arrangement of gain adjusting circuit 5 changes the level of the edge of the edge signal depending on the brightness. Specifically, when the level of the luminance signal Y is high, i.e., the brightness is high, gain adjusting circuit 5 lowers the level of the edge as indicated by the broken-line curve shown in FIG. 16, and when the level of the luminance signal Y is low, i.e., the brightness is low, gain adjusting circuit 5 increases the level of the edge.

In the present embodiment, as described above, the picture quality improving apparatus can operate to carry out the flare correction according to the first embodiment and simultaneously achieve the visual effect of contrast according to the Craik-O'Brien effect.

Third Embodiment: Compatibility with Wide Screen

Figure 17A:
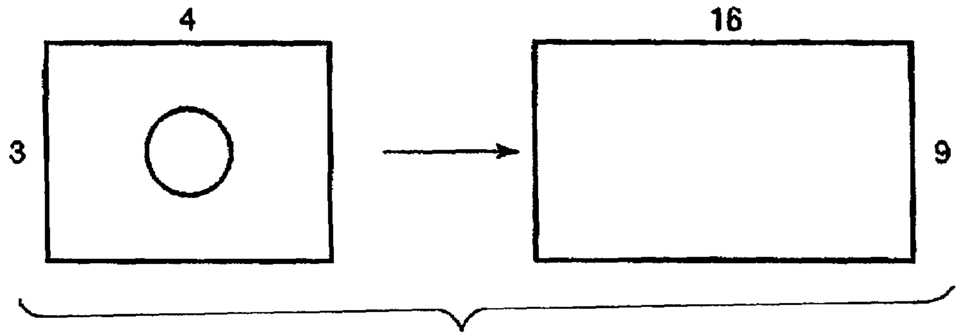
FIG. 17A is a diagram showing an original picture having-an aspect ratio of 3:4 which is to be displayed on a wide screen.
Figure 17B:
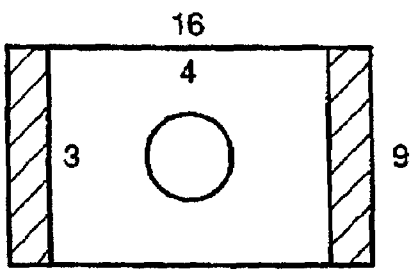
FIG. 17B is a diagram showing the original picture displayed on the wide screen in a normal display mode.

There are several display modes available for displaying a picture signal having an aspect ratio of 3:4 on a wide screen having an aspect ratio of 9:16. FIGS. 17A to 17E show those several display modes for displaying pictures on a wide screen. FIG. 17A shows an original picture having an aspect ratio of 3:4 which is to be displayed on a wide screen. The left portion of FIG. 17A illustrates a screen having an aspect ratio of 3:4 and the right portion illustrates a wide screen having an aspect ratio of 9:16. The various display modes will be described below with respect to an example in which a picture having a circle at its center at an aspect ratio of 3:4 is to be displayed on a wide screen having an aspect ratio of 9:16. The display modes include a normal display mode, a full display mode, a zoom display mode, and a nonlinear display mode. FIG. 17B illustrates the normal display mode, FIG. 17C the full display mode, FIG. 17D the zoom display mode, and FIG. 17E the nonlinear display mode.

Figure 17C:
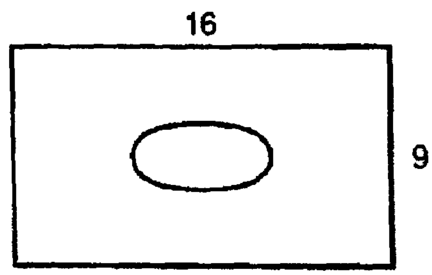
FIG. 17C is a diagram showing the original picture displayed on the wide screen in a full display mode.
Figure 17D:
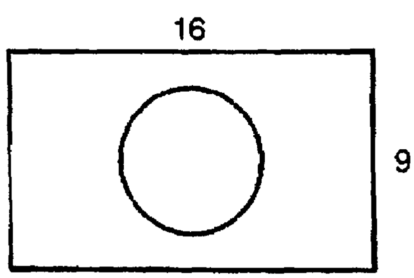
FIG. 17D is a diagram showing the original picture displayed on the wide screen in a zoom display mode.
Figure 17E:
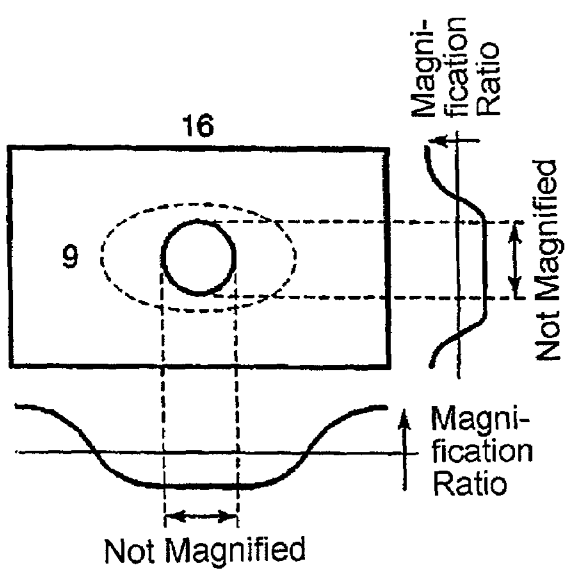
FIG. 17E is a diagram showing the original picture displayed on the wide screen in a nonlinear display mode.

In the normal display mode, as shown in FIG. 17B, the original picture shown in FIG. 17A is directly displayed centrally on the wide screen in a display area which serves as an effective area. Areas shown hatched on both sides of the effective area are black areas. In the full display mode, as shown in FIG. 17C, the original picture shown in FIG. 17A is displayed as a picture expanded horizontally at a given magnification ratio. In the zoom display mode, as shown in FIG. 17D, the original picture shown in FIG. 17A is displayed as a picture expanded both vertically and horizontally at the same magnification ratio. In the nonlinear display mode, as shown in FIG. 17E, the original picture shown in FIG. 17A is displayed as a picture which is not magnified in a certain central area and is magnified at a magnification ratio as it becomes progressively higher outwardly from the central area.

When a picture is displayed on a wide screen, the picture is displayed in either one of the above display modes. In order to adapt the picture quality improving apparatus according to the first and second embodiments to the above display modes, it is necessary to process video signals in those display modes as follows:

(1) Normal Display Mode

Figure 18:
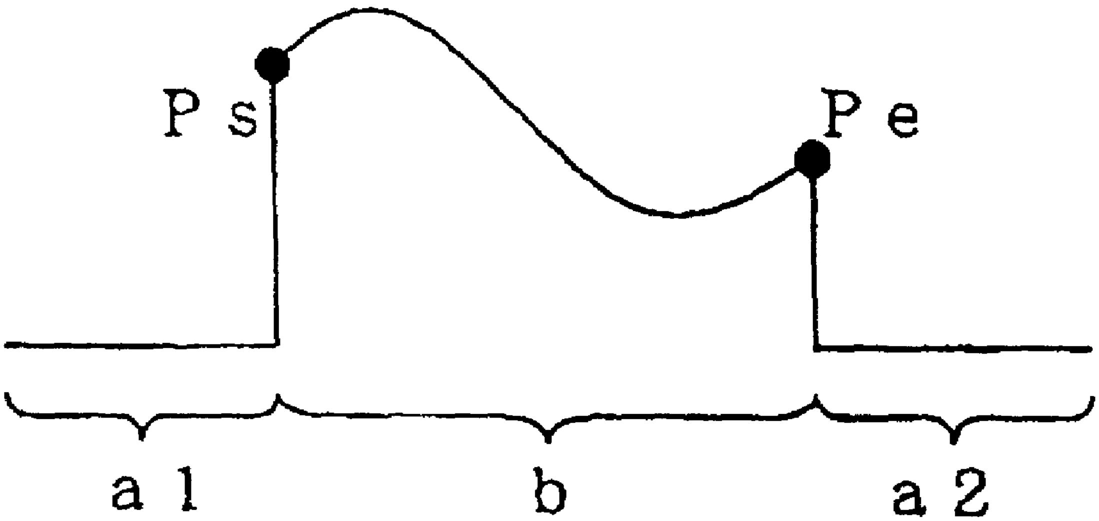
FIG. 18 is a diagram showing the waveform of a video signal in a horizontal direction for display in the normal display mode.

When the normal display mode is selected, the picture quality improving process is carried out on the original picture which is the picture with the black areas in its opposite sides, as shown in FIG. 17B, for example. The original picture having an aspect ratio of 3:4 has upper, lower, left, and right black areas (blanking areas) therein. Since the picture quality improving apparatus according to the first and second embodiments are arranged to detect an edge, when they process the above original picture, they detect edges at the boundaries between the black and effective areas, and the detected edges tend to cause a reduction in the picture quality. The reduction in the picture quality is avoided as follows:

FIG. 18 shows the waveform of a video signal in a horizontal direction in the normal display mode. In FIG. 18, zone al represents a black area (blanking area) on the left side of the picture, zone b represents an effective area for displaying the original picture, and zone a2 represents a black area (blanking area) on the right side of the picture. In HLPF 2 of the picture quality improving apparatus shown in FIG. 7, value PS at the start of the picture is set in all the registers when the effective area b begins, the values of the registers are shifted to update the picture during effective area b, and value Pc at the end of the picture is set (held) in the registers without updating the picture in the black area a2. Since there are usually blanking areas in the vertical direction of picture, VLPF 1 also performs the same process as with HLPF 2.

(2) Full Display Mode

When the full display mode is selected, if the original picture is expanded horizontally at a given magnification ratio after the picture quality improving apparatus shown in FIG. 7 has performed the flare correction and achieved the visual effect of contrast according to the Craik-O'Brien effect, the correction values are also expanded, failing to sufficiently achieve the desired corrective effects (the flare correction and the Craik-O'Brien effect). In this case, it is necessary to change, i.e., shorten, the response of HPLF 2 depending on the magnification ratio at which the picture is expanded. Specifically, the impulse response (filter coefficients) of HPLF 2 is set to reduce the width of the edge of the edge signal output from subtractor 4 by a value commensurate with the expansion of the picture.

(3) Zoom Display Mode

When the zoom display mode is selected, the effect of the picture expansion in the full display mode on the correction occurs also in the vertical direction. In the zoom display mode, it is necessary to change, i.e., shorten, the response of VLPF 1 and HPLF 2 depending on the magnification ratio at which the picture is expanded. Specifically, the impulse responses (filter coefficients) of VPLF 1 and HPLF 2 are set to reduce the width of the edge of the edge signal output from subtractor 4 by a value commensurate with the expansion of the picture.

(4) Nonlinear Display Mode

When the nonlinear display mode is selected, if the original mode is nonlinearly expanded after the picture quality improving apparatus shown in FIG. 7 has performed the flare correction and achieved the visual effect of contrast according to the Craik-O'Brien effect, the correction values are also expanded, failing to sufficiently achieve the desired corrective effects (the flare correction and the Craik-O'Brien effect). In this case, it is necessary to expand the original picture nonlinearly before the picture quality improving apparatus shown in FIG. 7 performs its corrective process. Specifically, a nonlinear processing circuit for displaying the original picture in the nonlinear display mode may be connected to the input side of the picture quality improving apparatus shown in FIG. 7.

In each of the above embodiments, a picture displayed based on a video signal includes an effective area where picture information is represented and black areas (blanking areas) free of picture information around the effective area. With VPLF 1 of the picture quality improving apparatus shown in FIG. 7, all areas including the black areas are stored in memories. However, only the effective area may be stored in memories. Since the line delay is to be effected on only the effective area, the memory capacity required for the line delay may be small.

Figure 19:
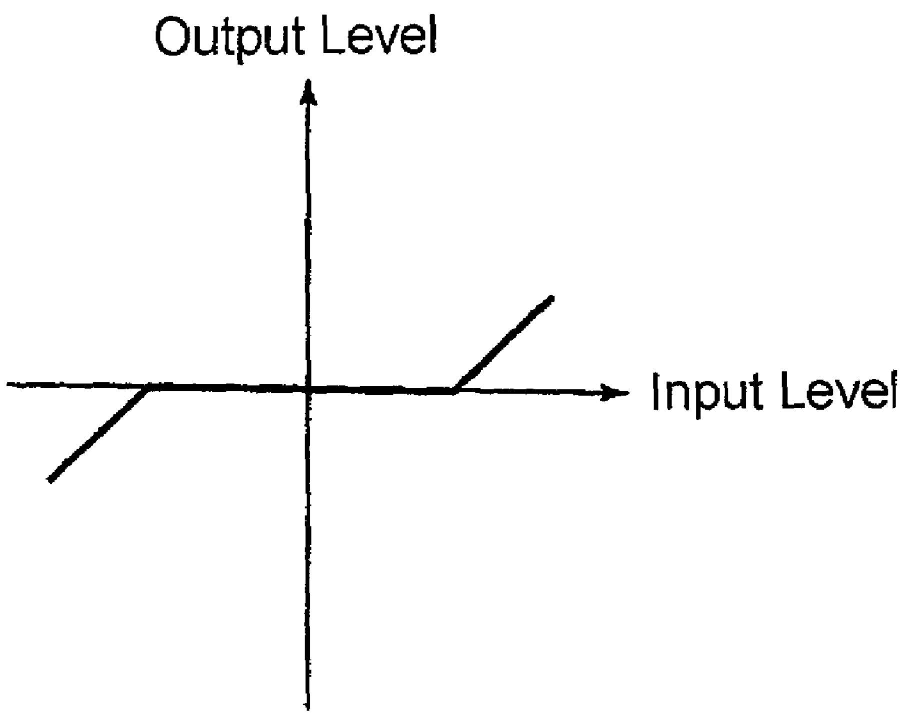
FIG. 19 is a diagram showing the characteristics of a coring circuit.

A coring circuit may be provided in the output stage of subtractor 4 of the picture quality improving apparatus shown in FIG. 7. FIG. 19 shows the characteristics of such a coring circuit, the horizontal axis representing an input level and the vertical axis an output level. The coring circuit removes edges responsible for noise, i.e., edges below a given level, from the edge signal output from subtractor 4, for thereby increasing the S/N ratio.

A video signal captured by an imaging device having an optical system already contains flare caused by the optical system. As the amount of such flare can be adjusted by the gain adjusting circuit, the picture quality improving apparatus according to the present invention is also applicable to the processing of video signals containing such flare.

While preferred embodiments of the present invention have been described using specific terms, such description is for illustrative purposes only, and it is to be understood that changes and variations may be made without departing from the spirit or scope of the appended claims.

What is claimed is:

1. An apparatus for improving quality of a picture, comprising:

a two-dimensional low-pass filter for being supplied with a luminance signal obtained from a video signal and extracting, from the supplied luminance signal, low-frequency components in vertical and horizontal directions of a picture displayed based on the video signal;

a subtractor for subtracting the low-frequency components extracted by said two-dimensional low-pass filter from said luminance signal thereby to generate an edge signal; and an adder for adding said edge signal generated by said subtractor to said luminance signal;

said two-dimensional low-pass filter comprising a vertical low-pass filter for extracting the low-frequency component in the vertical direction and a horizontal low-pass filter for extracting the low-frequency component in the horizontal direction;

said vertical low-pass filter having a first FIR (finite impulse response) filter and a first IIR (infinite impulse response) filter which are connected in cascade;

said horizontal low-pass filter having a second FIR filter and a second IIR filter which are connected in cascade.

2. An apparatus according to claim 1, further comprising gain adjusting means for being supplied with the luminance signal as a control signal and adjusting a level of an edge of the edge signal output from said subtractor depending on a brightness level of said luminance signal.

3. An apparatus according to claim 1, wherein a level and a size of a slope of an edge of the edge signal output from said subtractor and corresponding to a contour of the picture displayed based on the video signal are set to predetermined magnitudes.

4. An apparatus according to claim 3, wherein said predetermined magnitudes are selected to cause visual illusion according to Craik-O'Brien effect.

5. An apparatus according to claim 1, wherein the picture displayed based on the video signal has a black area free of picture information and an effective area containing picture information, said two-dimensional filter being arranged to output a signal held to a predetermined value in said black area.

6. An apparatus according to claim 1, wherein the picture displayed based on the video signal is expanded horizontally at a predetermined magnification ratio, said horizontal low-pass filter having response characteristics arranged to be shorter by said predetermined magnification ratio than the response characteristics to be provided if said picture is not expanded.

7. An apparatus according to claim 1, wherein the picture displayed based on the video signal is expanded horizontally and vertically respectively at predetermined magnification ratios, said vertical and horizontal low-pass filters having respective response characteristics arranged to be shorter by said predetermined magnification ratios than the response characteristics to be provided if said picture is not expanded.

8. An apparatus according to claim 1, further comprising a circuit in an input stage of said two-dimensional filter, for nonlinearly expanding the picture displayed based on the video signal.

9. An apparatus according to claim 1, wherein the picture displayed based on the video signal has a black area free of picture information and an effective area containing picture information, said two-dimensional filter being arranged to filter the luminance signal only in said effective area.

10. An apparatus for improving quality of a picture, comprising:

a two-dimensional low-pass filter for being supplied with a luminance signal obtained from a video signal and extracting, from the supplied luminance signal, low-frequency components in vertical and horizontal directions of a picture displayed based on the video signal;

a subtractor for subtracting the low-frequency components extracted by said two-dimensional low-pass filter from said luminance signal thereby to generate an edge signal; and an adder for adding said edge signal generated by said subtractor to said luminance signal;

said two-dimensional low-pass filter comprising a vertical low-pass filter for extracting the low-frequency component in the vertical direction and a horizontal low-pass filter for extracting the low-frequency component in the horizontal direction;

said vertical low-pass filter having a first FIR (finite impulse response) filter and a first IIR (infinite impulse response) filter which are connected parallel to each other;

said horizontal low-pass filter having a second FIR filter and a second IIR filter which are connected parallel to each other.

11. An apparatus according to claim 10, further comprising gain adjusting means for being supplied with the luminance signal as a control signal and adjusting a level of an edge of the edge signal output from said subtractor depending on a brightness level of said luminance signal.

12. An apparatus according to claim 10, wherein a level and a size of a slope of an edge of the edge signal output from said subtractor and corresponding to a contour of the picture displayed based on the video signal are set to predetermined magnitudes.

13. An apparatus according to claim 12, wherein said predetermined magnitudes are selected to cause visual illusion according to Craik-O'Brien effect.

14. An apparatus according to claim 10, wherein the picture displayed based on the video signal has a black area free of picture information and an effective area containing picture information, said two-dimensional filter being arranged to output a signal held to a predetermined value in said black area.

15. An apparatus according to claim 10, wherein the picture displayed based on the video signal is expanded horizontally at a predetermined magnification ratio, said horizontal low-pass filter having response characteristics arranged to be shorter by said predetermined magnification ratio than the response characteristics to be provided if said picture is not expanded.

16. An apparatus according to claim 10, wherein the picture displayed based on the video signal is expanded horizontally and vertically respectively at predetermined magnification ratios, said vertical and horizontal low-pass filters having respective response characteristics arranged to be shorter by said predetermined magnification ratios than the response characteristics to be provided if said picture is not expanded.

17. An apparatus according to claim 10, further comprising a circuit in an input stage of said two-dimensional filter, for nonlinearly expanding the picture displayed based on the video signal.

18. An apparatus according to claim 10, wherein the picture displayed based on the video signal has a black area free of picture information and an effective area containing picture information, said two-dimensional filter being arranged to filter the luminance signal only in said effective area.

19. An apparatus for improving quality of a picture, comprising:

a two-dimensional low-pass filter for being supplied with a luminance signal obtained from a video signal and extracting, from the supplied luminance signal, low-frequency components in vertical and horizontal directions of a picture displayed based on the video signal;

a subtractor for subtracting the low-frequency components extracted by said two-dimensional low-pass filter from said luminance signal thereby to generate an edge signal; and an adder for adding said edge signal generated by said subtractor to said luminance signal;

said two-dimensional low-pass filter comprising a vertical low-pass filter for extracting the low-frequency component in the vertical direction and a horizontal low-pass filter for extracting the low-frequency component in the horizontal direction;

each of said vertical and horizontal low-pass filters having a combination of an FIR (finite impulse response) filter and an IIR (infinite impulse response) filter.

20. An apparatus according to claim 19, further comprising gain adjusting means for being supplied with the luminance signal as a control signal and adjusting a level of an edge of the edge signal output from said subtractor depending on a brightness level of said luminance signal.

21. A method of improving quality of a picture, comprising the steps of:

extracting low-frequency components in vertical and horizontal directions of a picture displayed based on a video signal from a luminance signal obtained from said video signal, and producing extracted low-frequency signals;

subtracting the extracted low-frequency component signals from said luminance signal thereby to generate an edge signal representing an edge corresponding to a contour of said picture and having a level and a slope of predetermined magnitudes; and adding said edge signal to said luminance signal.

22. A method according to claim 21, wherein said subtracting step further comprises the step of adjusting the level of the edge of the edge signal depending on the brightness level of said luminance signal.

23. A method according to claim 21, wherein said predetermined magnitudes are selected to cause visual illusion according to Craik-O'Brien effect.

24. A method according to claim 21, wherein the picture displayed based on the video signal has a black area free of picture information and an effective area containing picture information, said subtracting step further comprises the step of outputting a signal held to a predetermined value in said black area.

25. A method according to claim 21, further comprising the step of expanding the picture displayed based on the video signal horizontally at a predetermined magnification ratio, wherein said extracting step comprises the step of using a horizontal low-pass filter having response characteristics arranged to be shorter by said predetermined magnification ratio than the response characteristics to be provided if said picture is not expanded.

26. A method according to claim 21, further comprising the step of expanding the picture displayed based on the video signal vertically and horizontally respectively at predetermined magnification ratios;

wherein said extracting step comprises the step of using vertical and horizontal low-pass filters having respective response characteristics arranged to be shorter by said predetermined magnification ratios than the response characteristics to be provided if said picture is not expanded.

27. A method according to claim 21, further comprising the step of nonlinearly expanding the picture displayed based on the video signal, prior to the extracting step.

28. A method according to claim 21, wherein the picture displayed based on the video signal has a black area free of picture information and an effective area containing picture information, and said extracting step comprises the step of extracting low-frequency components only in said effective area.

* * * * *